(12) United States Patent
Nakamura et al.

(10) Patent No.: US 12,190,149 B2
(45) Date of Patent: Jan. 7, 2025

(54) SCHEDULING CONTROL APPARATUS, SCHEDULING CONTROL METHOD AND PROGRAM FOR MINIMIZING TOTAL COST IN SERVICE SYSTEM

(71) Applicant: NIPPON TELEGRAPH AND TELEPHONE CORPORATION, Tokyo (JP)

(72) Inventors: Ryota Nakamura, Musashino (JP); Shigeaki Harada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 440 days.

(21) Appl. No.: 17/627,888

(22) PCT Filed: Jul. 24, 2019

(86) PCT No.: PCT/JP2019/029080
§ 371 (c)(1),
(2) Date: Jan. 18, 2022

(87) PCT Pub. No.: WO2021/014624
PCT Pub. Date: Jan. 28, 2021

(65) Prior Publication Data
US 2022/0253334 A1   Aug. 11, 2022

(51) Int. Cl.
*G06F 9/48* (2006.01)
*G06Q 50/06* (2012.01)

(52) U.S. Cl.
CPC ........... *G06F 9/4881* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 7,844,839 | B2 * | 11/2010 | Palmer | H04L 67/1008 718/1 |
| 8,224,993 | B1 * | 7/2012 | Brandwine | G06F 1/3287 713/320 |
| 9,409,230 | B2 * | 8/2016 | Hama | B22D 11/12 |
| 10,098,062 | B2 * | 10/2018 | Poleg | H04L 43/08 |
| 10,334,032 | B2 * | 6/2019 | Sun | H04L 41/0803 |
| 10,423,607 | B2 * | 9/2019 | Shin | G06F 16/9024 |

(Continued)

OTHER PUBLICATIONS

Joe-Wong et al "Interdatacenter Job Routing and Scheduling With Variable Costs and Deadlines", 2015 IEEE, pp. 2669-2680.*

(Continued)

*Primary Examiner* — Van H Nguyen
(74) *Attorney, Agent, or Firm* — IPUSA, PLLC

(57) ABSTRACT

A scheduling control device performs scheduling that includes generating a directed graph having a source node, n layers of nodes, each layer of nodes of the n layers of nodes consisting of k nodes respectively corresponding to k job processing devices, and a destination node, a cost required for processing a job being allocated to each node of the n layers of nodes as a weight, a cost required for migrating the job from one of job processing devices to another one of the job processing devices being allocated as a weight on an edge; and calculating a shortest path from the source node to the destination node in the directed graph as a result of scheduling.

6 Claims, 6 Drawing Sheets

(56) References Cited

U.S. PATENT DOCUMENTS

| | | | | |
|---|---|---|---|---|
| 10,996,733 | B2* | 5/2021 | Lee | G06F 11/3062 |
| 11,375,007 | B2* | 6/2022 | Nakamura | H04L 67/1008 |
| 11,395,308 | B2* | 7/2022 | Zhang | H04L 45/121 |
| 2013/0030859 | A1 | 1/2013 | Jung et al. | |
| 2014/0298349 | A1* | 10/2014 | Jackson | G06F 1/3206 |
| | | | | 718/104 |
| 2020/0351900 | A1* | 11/2020 | Zhang | H04W 4/029 |

OTHER PUBLICATIONS

Aikema et al "Energy-cost-aware scheduling of HPC workloads", 2011 IEEE, 7 pages.*

Tadahiko Murata et al., "Flowshop Scheduling by Genetic Algorithm and Its Application to Multi-Objective Problems", Proceedings of the Society of Instrument and Control Engineers, vol. 31, No. 5, 1995.

* cited by examiner

Fig. 4

| DATA CENTER | ELECTRICITY CHARGE UNIT PRICE IN EACH TIME SLOT | | |
|---|---|---|---|
| | 0:00-8:00 | 8:00-16:00 | 16:00-24:00 |
| A | 10 YEN | 15 YEN | 10 YEN |
| B | 13 YEN | 13 YEN | 13 YEN |
| C | 15 YEN | 14 YEN | 12 YEN |

SCHEDULING CONTROL APPARATUS, SCHEDULING CONTROL METHOD AND PROGRAM FOR MINIMIZING TOTAL COST IN SERVICE SYSTEM

TECHNICAL FIELD

The present invention relates to a scheduling technology for locating a job in a job processing device so as to minimize a total cost in a service system in which a cost required for job processing is changed according to the time.

BACKGROUND ART

In general, a local search method, genetic algorithm, or the like is used as a solution to a scheduling problem. For example, Non-Patent Literature 1 discloses a technique in which a genetic algorithm is applied to a scheduling problem, and furthermore, also discloses a comparison with other local search methods, Tabu search method, and the like.

Examples of the service system in which the cost required for job processing is changed according to the time include a virtual network environment in which an electricity charge unit price in each data center varies according to the time slot.

CITATION LIST

Non-Patent Literature

Non-Patent Literature 1: "Flowshop Scheduling by Genetic Algorithm and Its Application to Multi-Objective Problems", Tadahiko Murata, Hisao Ishibuchi, Hideo Tanaka, Transactions of the Society of Instrument and Control Engineers, Vol. 31, No. 5, 583/590, 1995

SUMMARY OF THE INVENTION

Technical Problem

In a virtual network environment in which an electricity charge unit price in each data center varies according to the time slot, a server load location that minimizes the total electricity charge is desirable.

Since additional power consumption due to live migration occurs in movement of a server load in the virtual network environment, total optimization is not achieved merely by applying an optimum solution in each time slot. Thus, optimum schedule control throughout the day is necessary upon consideration even of a server load movement cost in addition to transitions of parameters such as a future electricity charge unit price. However, no conventional technology for achieving such optimum schedule control has been proposed.

In addition, the problem in that optimum schedule control as described above is necessary is a problem not limited to the field of server location under a virtual network environment, but also may occur in all the service systems in which a cost required for job processing in a job processing device is changed according to the time.

The present invention has been made in view of the above points, and has an object to provide a scheduling technology that enables a job to be located so as to minimize a total cost in a service system in which a cost required for job processing in a job processing device is changed according to the time.

Means for Solving the Problem

According to the disclosed technology, a scheduling control device is provided that performs scheduling for locating a job in a job processing device so as to minimize a total cost in a service system in which a predetermined period is divided into n time slots based on timing at which a cost required for job processing is changed, the service system including k job processing devices. The scheduling control device includes: a directed graph generation unit that generates a directed graph having a source node, n-layer nodes including k nodes, respective layers corresponding to the job processing devices, and a destination node, a cost required for processing the job being allocated to each of the n-layer nodes as a weight, a cost required for migrating the job from one of the job processing devices to another one of the job processing devices being allocated as a weight on an edge; and a shortest path calculation unit that calculates a shortest path from the source node to the destination node in the directed graph as a result of scheduling.

Effects of the Invention

According to the disclosed technology, a scheduling technology is provided that enables a job to be located so as to minimize a total cost in a service system in which a cost required for job processing in a job processing device is changed according to the time.

BRIEF DESCRIPTION OF DRAWINGS

FIG. 4 is a drawing illustrating a comparison between electricity charge plans of respective companies.

DESCRIPTION OF EMBODIMENTS

Hereinafter, an embodiment of the present invention (the present embodiment) will be described with reference to the drawings. The embodiment which will be described below is merely an example, and the embodiment to which the present invention is applied is not limited to the following embodiment.

The following embodiment addresses, as an example of a service system, a virtual network environment in which an electricity charge unit price in each data center varies according to the time slot. A data center is provided with a computer as a job processing device, and a server operates on the computer. Locating a server in a data center indicates causing the server to operate on the computer in the data center. In addition, a "server" is an example of a job, and an "electricity charge" is an example of a cost.

Overview of Embodiment

In the present embodiment, a server load location that minimizes the total electricity charge in a virtual network environment in which an electricity charge unit price in each data center varies according to the time slot is obtained.

Specifically, in a server load location optimization schedule problem in which a transition of the electricity charge unit price in each data center is already known, a schedule control device generates a directed graph based on a time-series transition of each electricity charge with respect to changes in electricity charge unit price, and solves a shortest path problem in the graph to derive a server load location optimization schedule.

Hereinafter, a device configuration and a device operation will be described in detail.

(Device Configuration)

Figure 1:
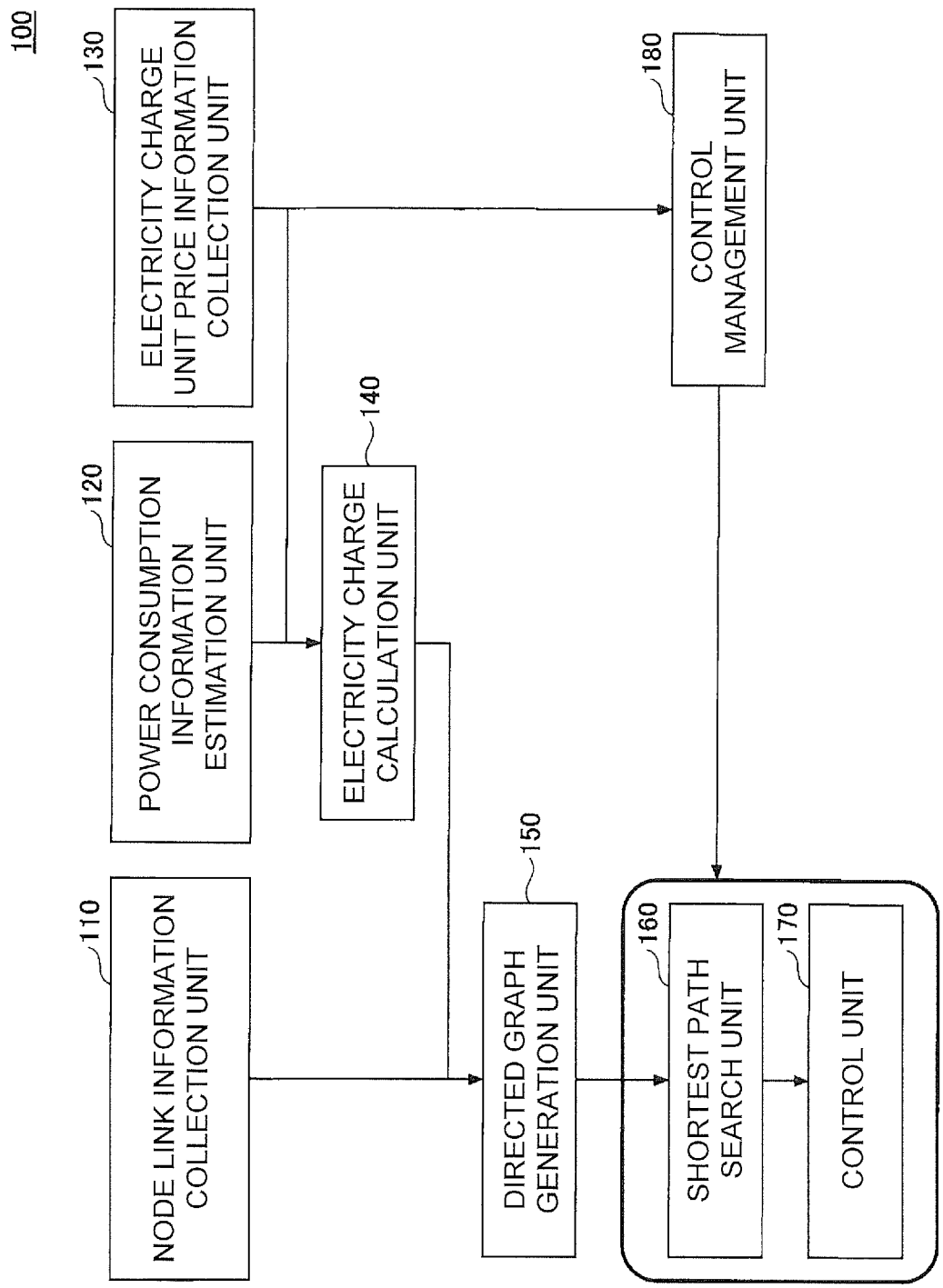
FIG. 1 is a configuration diagram of a schedule control device according to an embodiment of the present invention.

FIG. 1 illustrates a functional configuration of a scheduling control device 100 in the present embodiment. As illustrated in FIG. 1, the scheduling control device 100 has a node link information collection unit 110, a power consumption information estimation unit 120, an electricity charge unit price information collection unit 130, an electricity charge calculation unit 140, a directed graph generation unit 150, a shortest path search unit 160, a control unit 170, and a control management unit 180.

The node link information collection unit 110 collects network topology information such as the number of data centers in a target virtual network environment and a link between the respective data centers. The power consumption information estimation unit 120 estimates power consumption when operating a server in each data center.

The electricity charge unit price information collection unit 130 collects electricity charge plan information of each electric power company as each piece of parameter information that transitions according to the time. The electricity charge calculation unit 140 calculates an electricity charge necessary for operating the server and an electricity charge necessary for performing live migration for each time slot from the power consumption information and the electricity charge plan information.

The directed graph generation unit 150 generates a directed graph from node link information, parameter information, and an electricity charge calculation result. The shortest path search unit 160 derives the shortest path using a technique such as the Dijkstra's algorithm in the graph generated by the directed graph generation unit 150.

The control unit 170 exerts control based on a result derived from the shortest path search unit 160. In the present embodiment, the control unit 170 instructs an orchestrator that manages a virtual network on a control policy.

The control management unit 180 grasps a parameter-varying interval from the electricity charge unit price information collection unit, and based on that, instructs the shortest path search unit 160 and the control unit 170 on appropriate operation timing.

The scheduling control device 100 can be implemented by causing a computer to execute a program, for example.

In other words, the scheduling control device 100 can be implemented by executing a program corresponding to processing carried out in the scheduling control device 100 using hardware resources such as a CPU and a memory built in a computer. The above-described program can be recorded on a computer-readable recording medium (such as a portable memory) for storage and distribution. Alternatively, the above-described program can be provided over a network such as the Internet or e-mail.

Figure 2:
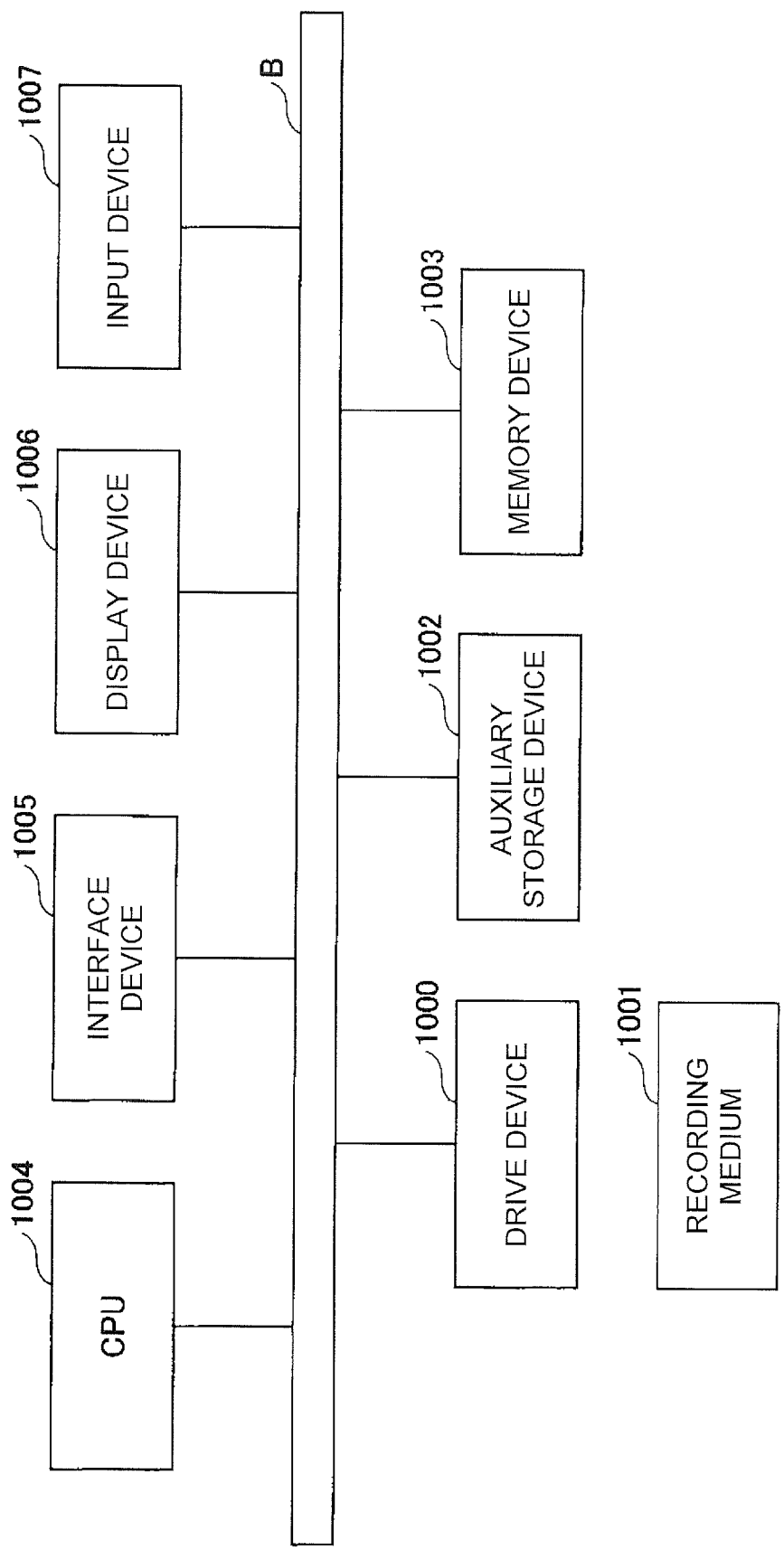
FIG. 2 is a drawing illustrating a hardware configuration example of the schedule control device.

FIG. 2 is a drawing illustrating a hardware configuration example of the above-described computer. The computer in FIG. 2 has a drive device 1000, an auxiliary storage device 1002, a memory device 1003, a CPU 1004, an interface device 1005, a display device 1006, an input device 1007, and the like, each being connected to each other with a bus B.

The program that implements processing in the computer is provided by a recording medium 1001 such as a CD-ROM or memory card, for example. When the recording medium 1001 storing the program is set in the drive device 1000, the program is installed into the auxiliary storage device 1002 from the recording medium 1001 via the drive device 1000. However, it is not necessarily required to install the program from the recording medium 1001, but may be downloaded from another computer through a network. The auxiliary storage device 1002 stores the installed program, and also stores necessary files, data, and the like.

The memory device 1003 reads out and stores the program from the auxiliary storage device 1002 in a case in which a program running instruction is received. The CPU 1004 implements functions related to the scheduling control device 100 in accordance with the program stored in the memory device 1003. The interface device 1005 is used as an interface for connection to a network, and functions as input means and output means through the network. The display device 1006 displays a GUI (Graphical User Interface) and the like in accordance with the program. The input device 157 is composed of a keyboard and mouse, buttons, a touch panel, or the like, and is used for input of various operation instructions.

Hereinafter, a specific example of an operation of the scheduling control device 100 will be described using an example below.

Example

Figure 3:
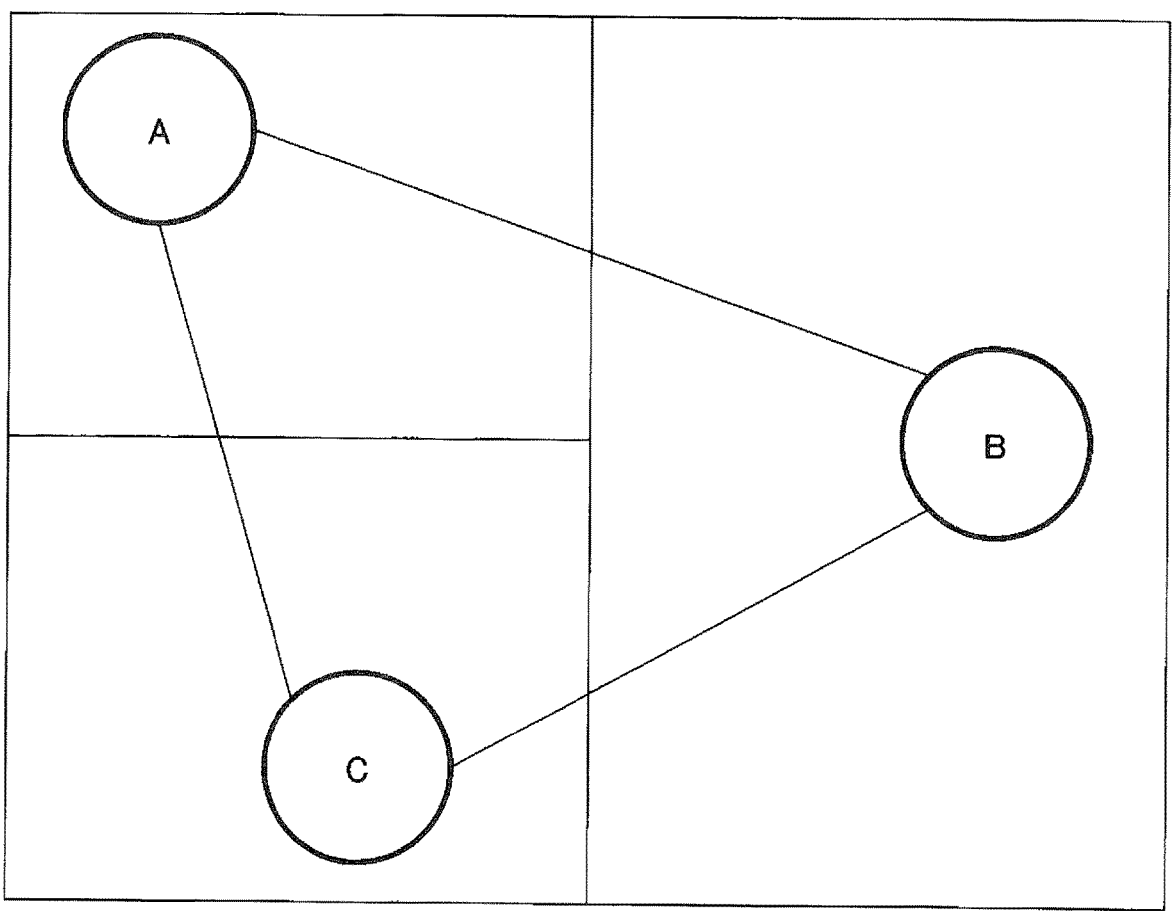
FIG. 3 is a drawing illustrating an example of a network topology.

FIG. 3 illustrates a physical network topology that implements a virtual network in the present example. In FIG. 3, data centers (specifically, computers in data centers) are denoted by A, B, and C, and lines connecting them indicate links. Such topology information is collected by the node link information collection unit 110.

A, B, and C are under the jurisdictions of respective electric power companies, and the jurisdictions of the respective electric power companies are illustrated in FIG. 3 by blocks in which A, B, and C are present. For example, A is under the jurisdiction of an electric power company T, B is under the jurisdiction of an electric power company K, and C is under the jurisdiction of an electric power company H. Since the electric power companies provide electricity charge plans different from each other, an electric power company area in which the lowest price is offered varies between time slots.

FIG. 4 illustrates an example of electricity charge plans of the respective companies collected by the electricity charge unit price information collection unit 130. Pieces of information collected by the node link information collection unit 110 and the electricity charge unit price information collection unit 130 are stored in storage means such as the memory device 1003, and is read out from another function unit to be used for a calculation.

In a virtualized environment, a server that provides a certain service can be relocated flexibly between data centers. Thus, by locating the server in a data center belonging to an electric power company area that provides the lowest electricity charge plan in each time slot, the electricity charge can be reduced.

In the example illustrated in FIG. 4, for example, from 12:00 a.m. to 8:00 a.m., the electric power company to which A belongs, from 8:00 a.m. to 4:00 p.m., the electric power company to which B belongs, and from 4:00 p.m. to 12:00 a.m., the electric power company to which A belongs respectively provide the lowest electricity charge plan. That is, it is considered that relocating the server in the order of the data centers A→B→A achieves the highest cost advantage.

On the other hand, in order to relocate the server, live migration is necessary. In order to achieve live migration, it is necessary to duplicate and synchronize a task state and a database between a server before migration and a server after migration, and while data transfer therefor is occurring, a time occurs during which the two servers are operating concurrently. Thus, additional power consumption occurs separately from power consumption for providing a service.

Accordingly, even if the server is relocated in the order of A→B→A as described above, a live migration cost is increased by relocation of A→B and relocation of B→A, and therefore the total electricity charge throughout the day may possibly be minimized in a case of not performing relocation, such as A→A→A.

In such a situation, total optimization is not achieved merely by applying an optimum solution in each time slot, and schedule control even upon consideration of future parameter transitions is required. Hereinafter, processing details for deriving an optimum schedule will be described in detail.

<Generation of Directed Graph and Calculation of Electricity Charge>

In order to derive an optimum schedule, the directed graph generation unit 150 generates a directed graph through the following procedure from S1 to S7.

S1) Twenty-four hours are divided into n (where n is an integer more than or equal to 0) sections (called layers) based on timing at which the electricity charge is changed. In the example of FIG. 4, twenty-four hours are divided into three layers.

S2) When assuming the number of data centers as k (where k is an integer more than or equal to 0), k (number)×n (layer) nodes are generated. In the example of FIG. 3 and FIG. 4, 3×3 nodes are generated.

S3) A single source node is added as a 0th layer, and a single destination node is added as an (n+1)-th layer.

S4) Edges are generated from a j-th node in an i∈{0, . . . , n+1}-th layer to all the nodes in an (i+1)-th layer. That is, edges are generated from each node in the i-th layer to all the nodes in the (i+1)-th layer.

S5) As a weight on a node, an electricity charge when operating the server in that node (data center) is allocated.

S6) As a weight on an edge, an electricity charge required when performing live migration from a node in the i-th layer to a node in the (i+1)-th layer is allocated.

S7) The weights on all the edges connected to the 0th layer and the (n+1)-th layer are made zero.

The electricity charge to be used as the above-described weight on the node/edge is calculated by the electricity charge calculation unit 140.

Specifically, the electricity charge calculation unit 140 calculates each electricity charge by multiplication of an electricity charge unit price (yen/kWh), an apparatus operation time (h), and power consumption (kW). As the electricity charge unit price, a value collected by the electricity charge unit price information collection unit 130 is used. As the apparatus operation time, the length of a time slot corresponding to a layer is used for a node, while a time required for live migration is used for an edge.

The power consumption information estimation unit 120 estimates power consumption required for the server operation and live migration from past performance data. The power consumption information estimation unit 120 estimates power consumption by taking the average of power consumption of nodes while the server is operating in a certain fixed period in the past based on the following expression, for example.

$$P_i = \frac{1}{\sum_{Xi(t)=1}(t1-t0)} \int_{t0}^{t1} P_i(t) * X_i(t) dt \qquad \text{[Math. 1]}$$

$P_i$: an estimated value of power consumption while a server i is operating;
t0: a starting point of a time when taking the average;
t1: an end point of a time when taking the average;
$P_i(t)$: power consumption of the server i at time t;
$X_i(t)=1$ (a case in which the server i is operating at the time t)=
=0 (except above case); and
$\in_{xi(t)=1}(t1-t0)$: the total time during which the server i is operating from time t0 to t1.

As to the period to be used for averaging, it is considered to use data for one week, for example. Alternatively, a method of taking a weighted average in accordance with a parameter such as the temperature in a server room may be used. Furthermore, a method of applying performance data of the previous day may be used.

Figure 5:
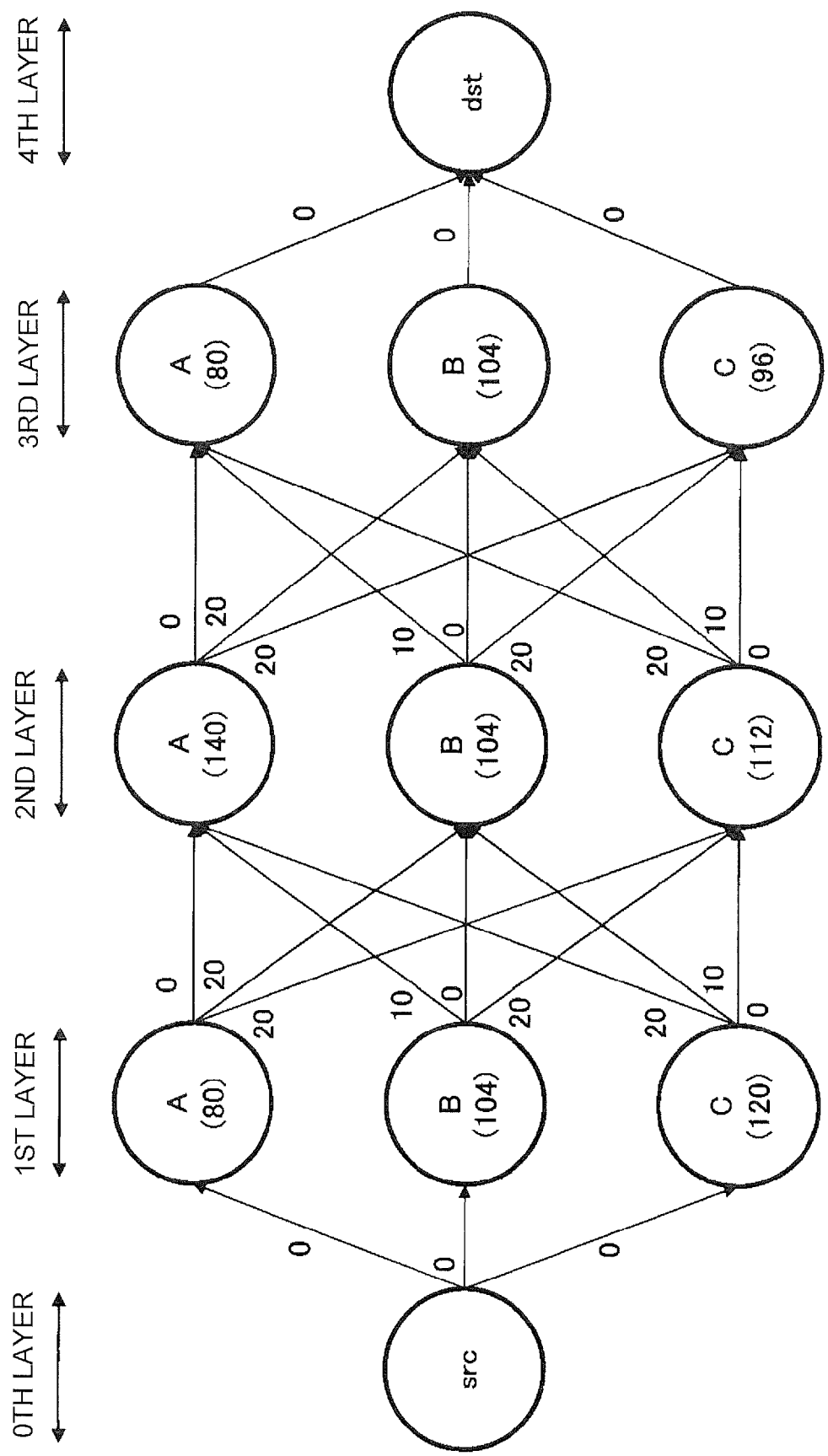
FIG. 5 is a drawing illustrating a topology-based directed graph.

FIG. 5 illustrates a directed graph generated by the directed graph generation unit 150 in the present example.

In FIG. 5, the 1st to 3rd layers respectively represent time slots of 12:00 a.m. to 8:00 a.m., 8:00 a.m. to 4:00 p.m., and 4:00 p.m. to 12:00 a.m. The nodes A, B, and C indicate data centers belonging to the respective electric power companies, and the numbers in parentheses each indicate an electricity charge when operating the server in that data center. The numbers on the edges each indicate an electricity charge required when performing live migration for relocation when the time slot is changed. Since relocation is not performed for A→A, B→B, and C→C, the electricity charge is 0.

<Shortest Path Search>

The shortest path search unit 160 obtains the shortest path from [src] to [dst] regarding an electricity charge at each node and edge in the directed graph as a path length. Passing through a node on the path indicates operating the server in that data center in the time slot.

A case in which the shortest path is A→B→A, for example, indicates locating the server in the data center A from 12:00 a.m. to 8:00 a.m., in the data center B from 8:00 a.m. to 4:00 p.m., and in the data center A from 4:00 p.m. to 12:00 a.m. Since the path length indicates the total electricity charge required a day, an operation schedule that achieves the lowest electricity charge will be taken by operating the server on the shortest path in the respective time slots.

The technique for obtaining the shortest path from [src] to [dst] in the directed graph is not limited to a specific technique, but the Dijkstra's algorithm or the Bellman-Ford algorithm can be used, for example.

<Control>

In the case in which the shortest path is A→B→A, for example, the control unit 170 transmits control information instructing to locate the server in the data center A from 12:00 a.m. to 8:00 a.m., in the data center B from 8:00 a.m.

to 4:00 p.m., and in the data center A from 4:00 p.m. to 12:00 a.m. to an orchestrator that manages a virtual network. The orchestrator executes live migration of the server in accordance with the control information when a relevant time arrives.

Example of Case of Considering Upper Limits of Server Capacity and Link Bandwidth Although the upper limits of server capacity and link bandwidth have not been considered above, an optimum schedule in which conditions for each facility, such as upper limits of server capacity and link bandwidth, are taken into consideration can be derived by the following method. Note that the server capacity and link bandwidth may be collectively called a facility amount.

As an example, a case in which, with respect to a server capacity of 100 GB required for providing a service, server capacities allocated to the respective data centers A, B, and C are 100 GB, 80 GB, and 100 GB, respectively, is considered.

Although the location of A→B→A as described above is optimum in a case in which there are no restrictions on server capacity, the data center B runs short of a server capacity of 20 GB during the daytime in the present example. In this case, the scheduling control device 100 locates a load of 80 GB (a facility amount that the service system has) by performing optimum schedule processing already described above, and schedules the remaining load of 20 GB (the insufficient facility amount) again. Such execution and control of scheduling is performed by the control management unit 180, for example.

Figure 6:
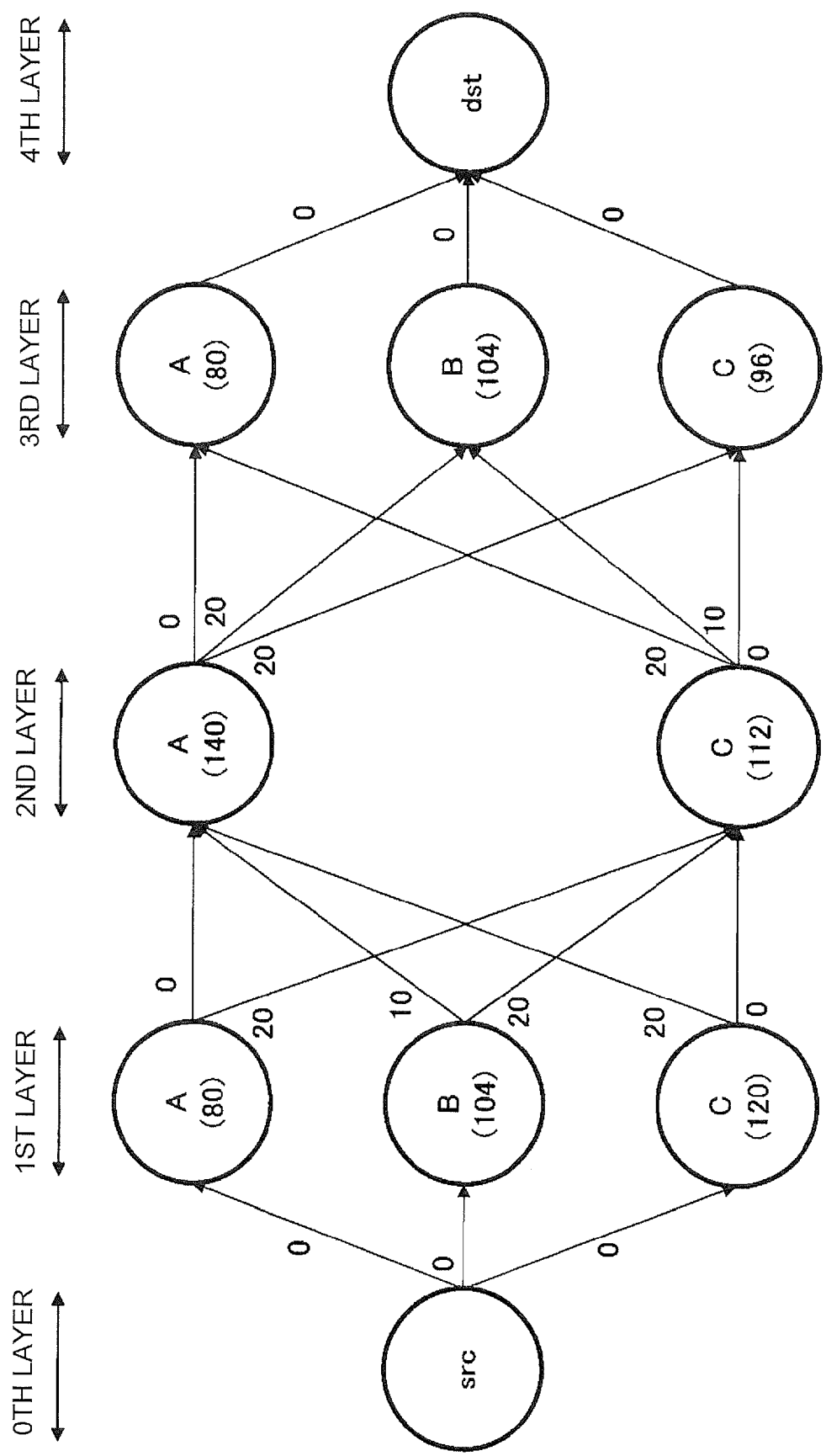
FIG. 6 is a drawing illustrating a directed graph in which a bottleneck has been removed.

For relocation of the remaining load of 20 GB, the directed graph generation unit 150 generates a directed graph in which the data center B in the daytime (the 2nd layer) which is a bottleneck has been removed from the graph, and the shortest path search unit 160 solves the shortest path problem again in a new directed graph illustrated in FIG. 6 to derive an optimum schedule.

For relocation of the load of 20 GB, A→A→A is the optimum schedule. That is, of 100 GB, 80 GB is located in A→B→A, and 20 GB is located in A→A→A.

The case in which the server capacity is a bottleneck has been described above, whilst in a case in which the link bandwidth is a bottleneck, a locating schedule for an excess of bandwidth can be derived by similarly removing the link from the directed graph.

Other Examples

In the present example, a day is divided into a plurality of time slots, and an optimum schedule in the day is derived, whilst the technology according to the present invention does not limit a schedule derivation target period to a day, and can also be applied to a problem of, taking variations from season to season, for example, into consideration, dividing a year into quarters and deriving an optimum schedule throughout the year.

Furthermore, in the present example, an example of reducing the electricity charge in a virtual network focusing on the electricity charge unit price that varies from area to area has been described as a problem to be addressed, whilst the field of application of the technology according to the present invention is not limited to this.

For example, the present invention can be applied to derivation of an optimum rate plan migration schedule in a case in which, in a rate plan for a certain service, the cheapest plan varies from period to period, and plan migration requires a fee such as a cancellation fee. The present invention can also be applied widely to a problem in which, in a schedule problem in which a plurality of machines different in efficiency sequentially process a certain job as in the present example, a loss (equivalent to a live migration cost in the present example) occurs when the job is transferred between the machines.

Effects of Embodiment

As described above, the technology according to the present embodiment enables an optimum solution to be easily derived by applying a graph and using an existing optimization technique for solving the optimum scheduling problem.

Conclusion of Embodiment

The present specification at least discloses a scheduling control device, scheduling control method, and program of the following items.
(Item 1)

A scheduling control device that performs scheduling for locating a job in a job processing device so as to minimize a total cost in a service system in which a predetermined period is divided into n time slots based on timing at which a cost required for job processing is changed, the service system including k job processing devices, the scheduling control device including:

a directed graph generation unit that generates a directed graph having a source node, n-layer nodes including k nodes, respective layers corresponding to the job processing devices, and a destination node, a cost required for processing the job being allocated to each of the n-layer nodes as a weight, a cost required for migrating the job from one of the job processing devices to another one of the job processing devices being allocated as a weight on an edge; and a shortest path calculation unit that calculates a shortest path from the source node to the destination node in the directed graph as a result of scheduling.
(Item 2)

A scheduling control device that performs scheduling for locating a server in a data center so as to minimize a total electricity charge in a service system in which a predetermined period is divided into n time slots based on timing at which an electricity charge is changed, the service system including k data centers, the scheduling control device including:

a directed graph generation unit that generates a directed graph having a source node, n-layer nodes including k nodes, respective layers corresponding to the data centers, and a destination node, an electricity charge required for operating the server being allocated to each of the n-layer nodes as a weight, an electricity charge required for live migration of the server from one of the data centers to another one of the data centers being allocated as a weight on an edge; and a shortest path calculation unit that calculates a shortest path from the source node to the destination node in the directed graph as a result of scheduling.
(Item 3)

The scheduling control device according to Item 2, including:

a power consumption information estimation unit that estimates power consumption to be used for calculating the electricity charge to be allocated to the node or the edge by calculating an average of power consumption while the server is operating in a past certain fixed period.
(Item 4)

The scheduling control device according to Item 2 or 3, wherein in the service system, the directed graph generation unit and the shortest path calculation unit perform scheduling for a facility amount that the service system has in a case in which the facility amount is insufficient for a facility amount required for providing a service, and for the insufficient facility amount, the directed graph generation unit further generates a directed graph in which a node or an edge to be a bottleneck has been removed, and the shortest path calculation unit calculates the shortest path from the source node to the destination node in the directed graph as a result of scheduling for the insufficient facility amount.

(Item 5)

A scheduling control method executed by a scheduling control device that performs scheduling for locating a job in a job processing device so as to minimize a total cost in a service system in which a predetermined period is divided into n time slots based on timing at which a cost required for job processing is changed, the service system including k job processing devices, the scheduling control method including:

a directed graph generation step of generating a directed graph having a source node, n-layer nodes including k nodes, respective layers corresponding to the job processing devices, and a destination node, a cost required for processing the job being allocated to each of the n-layer nodes as a weight, a cost required for migrating the job from one of the job processing devices to another one of the job processing devices being allocated as a weight on an edge; and a shortest path calculation step of calculating a shortest path from the source node to the destination node in the directed graph as a result of scheduling.

(Item 6)

A program for causing a computer to function as each unit in the scheduling control device according to any one of Items 1 to 4.

The present embodiment has been described above, but the present invention is not limited to such a specific embodiment, and various modifications and changes can be made within the scope of the present invention as described in the claims.

REFERENCE SIGNS LIST 100 scheduling control device
110 node link information collection unit
120 power consumption information estimation unit
130 electricity charge unit price information collection unit
140 electricity charge calculation unit
150 directed graph generation unit
160 shortest path search unit
170 control unit
180 control management unit
1000 drive device
1001 recording medium
1002 auxiliary storage device
1003 memory device
1004 CPU
1005 interface device
1006 display device
1007 input device

The invention claimed is:

1. A scheduling control device that performs scheduling for locating a job in a job processing device so as to minimize a total cost in a service system in which a predetermined period is divided into n time slots based on timing at which a cost required for job processing is changed, the service system including k job processing devices, the scheduling control device comprising:

a processor; and a memory that includes instructions, which when executed, cause the processor to execute the following steps:

collecting cost plan information of each job processing device, said cost plan information including parameter information that transitions according to the time, said parameter information including a cost required by each job processing device for the job processing for each of the n time slots, generating a directed graph having a source node, n layers of nodes, each layer of nodes of the n layers of nodes consisting of k nodes respectively corresponding to the k job processing devices, and a destination node, a cost required for processing the job being allocated to each node of the n layers of nodes as a weight, a cost required for migrating the job from one of the job processing devices to another one of the job processing devices being allocated as a weight on an edge;

calculating a shortest path from the source node to the destination node in the directed graph as a result of scheduling, and transmitting an instruction based on the shortest path to an orchestrator that manages a virtual network environment in which the cost in each job processing device varies according to the time slot and control the orchestrator to execute live migration of the each job processing device at the timing at which the cost required for job processing is changed based on instruction.

2. The scheduling control device according to claim 1, wherein each of the k job processing devices is a data center, the cost required for job processing is an electricity charge, the total cost is a total electricity charge, the locating the job in the job processing device is locating a server in a data center, the processing the job is operating the server, and the migrating the job from the one of the job processing devices to the another one of the job processing devices is live migration of the server from one of the data centers to another one of the data centers.

3. The scheduling control device according to claim 2, comprising: wherein the steps executed by the processor further includes estimating power consumption to be used for calculating the electricity charge to be allocated to the node or the edge by calculating an average of power consumption while the server is operating in a past certain fixed period.

4. The scheduling control device according to claim 2, wherein the steps executed by the processor further includes, upon detecting that a facility amount is insufficient for a facility amount required for providing a service in the service system, performing scheduling for the facility amount that the service system has, and, for the insufficient facility amount, generating a directed graph in which a node or an edge to be a bottleneck has been removed, and calculating the shortest path from the source node to the destination node in the directed graph as a result of scheduling for the insufficient facility amount.

5. A scheduling control method executed by a scheduling control device that performs scheduling for locating a job in a job processing device so as to minimize a total cost in a service system in which a predetermined period is divided into n time slots based on timing at which a cost required for job processing is changed, the service system including k job processing devices, the scheduling control method comprising:

collecting cost plan information of each job processing device, said cost plan information including parameter information that transitions according to the time, said parameter information including a cost required by each job processing device for the job processing for each of the n time slots, generating a directed graph having a source node, n layers of nodes, each layer of nodes of the n layers of nodes consisting of k nodes respectively corresponding to the k job processing devices, and a destination node, a cost required for processing the job being allocated to each node of the n layers of nodes as a weight, a cost required for migrating the job from one of the job processing devices to another one of the job processing devices being allocated as a weight on an edge;

calculating a shortest path from the source node to the destination node in the directed graph as a result of scheduling, and transmitting an instruction based on the shortest path to an orchestrator that manages a virtual network environment in which the cost in each job processing device varies according to the time slot and control the orchestrator to execute live migration of the each job processing device at the timing at which the cost required for job processing is changed based on instruction.

6. A non-transitory storage medium storing a program which, when executed by a scheduling control device that performs scheduling for locating a job in a job processing device so as to minimize a total cost in a service system in which a predetermined period is divided into n time slots based on timing at which a cost required for job processing is changed, the service system including k job processing devices, causes the scheduling control device to execute a scheduling control method comprising:

collecting cost plan information of each job processing device, said cost plan information including parameter information that transitions according to the time, said parameter information including a cost required by each job processing device for the job processing for each of the n time slots, generating a directed graph having a source node, n layers of nodes, each layer of nodes of the n layers of nodes consisting of k nodes respectively corresponding to the k job processing devices, and a destination node, a cost required for processing the job being allocated to each node of the n layers of nodes as a weight, a cost required for migrating the job from one of the job processing devices to another one of the job processing devices being allocated as a weight on an edge;

calculating a shortest path from the source node to the destination node in the directed graph as a result of scheduling, and transmitting an instruction based on the shortest path to an orchestrator that manages a virtual network environment in which the cost in each job processing device varies according to the time slot and control the orchestrator to execute live migration of the each job processing device at the timing at which the cost required for job processing is changed based on instruction.

* * * * *